(12) United States Patent
Chou

(10) Patent No.: US 7,152,333 B1
(45) Date of Patent: Dec. 26, 2006

(54) SIMPLE INSPECTION DEVICE FOR WHEEL ALIGNMENT

(75) Inventor: Shih-Jen Chou, Taipei (TW)

(73) Assignee: Sport Mind Motor Sport Development, Taipei Hsien (TW)

( * ) Notice: Subject to any disclaimer, the term of this patent is extended or adjusted under 35 U.S.C. 154(b) by 0 days.

(21) Appl. No.: 11/189,785

(22) Filed: Jul. 27, 2005

(51) Int. Cl.
*G01B 11/255* (2006.01)

(52) U.S. Cl. ................................. 33/203.18; 33/288

(58) Field of Classification Search .................. 33/203, 33/203.12, 203.15, 203.18, 203.19, 288, 33/600, 608
See application file for complete search history.

(56) References Cited

U.S. PATENT DOCUMENTS

| | | | | |
|---|---|---|---|---|
| 3,445,936 A | * | 5/1969 | Wilkerson | 33/288 |
| 3,889,527 A | * | 6/1975 | Wallace | 33/203 |
| RE32,926 E | * | 5/1989 | Colby | 33/608 |
| 4,898,464 A | * | 2/1990 | Thorne et al. | 33/203.18 |
| 5,020,231 A | * | 6/1991 | Huynh | 33/203.18 |
| 5,056,233 A | * | 10/1991 | Hechel et al. | 33/203.18 |
| 5,243,766 A | * | 9/1993 | Marley et al. | 33/288 |
| 5,919,238 A | * | 7/1999 | Lavey | 33/203 |
| 6,313,911 B1 | * | 11/2001 | Stieff | 33/288 |
| 6,526,665 B1 | * | 3/2003 | Jackson | 33/203.18 |

* cited by examiner

*Primary Examiner*—G. Bradley Bennett
(74) *Attorney, Agent, or Firm*—Troxell Law Office, PLLC

(57) ABSTRACT

A simple inspection device for wheel alignment is composed of a level inspecting rod and alignment inspecting racks, wherein a fixing member and a light emitter are located at two ends of the level inspecting rod, and the alignment inspecting rack includes an inspecting rod and a bracket. A scale meter is located at a proper position on the bracket, a lean-against member is located at a bottom of the bracket, and a tension member is located at a central part of the bracket. A bi-directional level and a light emitter are located at a top end of the inspecting rod, and a bi-directional level and an indication area corresponding to the light emitter are also located at the alignment inspecting rack at the other side. Accordingly, the device can be used to inspect a status of wheel alignment easily and conveniently.

9 Claims, 3 Drawing Sheets

SIMPLE INSPECTION DEVICE FOR WHEEL ALIGNMENT

BACKGROUND OF THE INVENTION (a) Field of the Invention

The present invention relates to a simple inspection device for wheel alignment, and more particularly to an inspection device which is used to examine that whether wheels of a car are actually aligned without offset. The inspection device is very easy and convenient to be installed and operated, thereby being suitable for a car driver to operate by oneself at home.

(b) Description of the Prior Art

In general, the wheel alignment for a car includes primarily a camber angle, a caster angle, a king pin inclination, a toe-in, and a toe-out on turn. When the car has been operated for a long time or its chassis elements have been replaced, the wheel rims (including frames and tires) might be deformed, and some portions of tires might be worn out, a steering wheel might be jittering while driving in low speed, the car might be drifting or the steering wheel might be shaking while driving in high speed, or it is hard to turn the steering wheel, and even that a danger of sideslip might occur, which are caused by an inaccurate alignment.

Moreover, when the car driver has noticed the aforementioned conditions, he usually will directly hand over the car to a service workshop to perform the task of wheel alignment and calibration with expensive and sophisticated computer instruments. However, a ordinary driver cannot determine a cause of the car problem at once; therefore, he needs to heavily rely on the service workshop, and thus will have to spend a lot of maintenance fees. It is even inconvenient to a car driver in Europe or United States, since most of the European or American drivers have a habit of changing tires by themselves. Therefore, it is even more expensive to go to the service workshop after changing the tires at every time.

Accordingly, the inventor has designed an inspection device which is very easy and convenient to use, and can be suitable for the car driver to operate by oneself at home, thereby saving a cost of making an inspection and repairing at the service workshop.

SUMMARY OF THE INVENTION

The primary object of the present invention is to provide a simple inspection device for wheel alignment, which is very easy and convenient to use, and is suitable for a car driver to operate by oneself at home.

Accordingly, the present invention includes a level inspecting rod and two alignment inspecting racks. A fixing member and a light emitter are located at two ends of the level inspecting rod, wherein the fixing member is used to fix on a steering wheel, and light emitted by the light emitter is shining on a scale meter on a bracket. A multi-leg bracket is located at a bottom of the alignment inspecting rack with the scale meter located at a proper position on the bracket. In addition, a lean-against member which can be latched on an edge of a frame is located at a bottom of the bracket, and a tension member which is hooked on the frame is extended from an inner surface of the frame in a central part of the bracket. A rotation member is installed at a connection point between the bracket and the inspecting rod; a pivot member and a retractable member are located at proper positions of the inspecting rod, and a bi-directional level and a light emitter are located at a very end of the bracket. On the other hand, another bi-directional level and an indication area corresponding to the light emitted by the light emitter are located at an alignment inspecting rack on the frame at the other side.

According to the aforementioned structure, the steering wheel is firstly put into a straight position, and then the level inspecting rod is fixed on the steering wheel, along with stretching the light emitter at the very end of the level inspecting rod out of a window. Next, the two alignment inspecting rods are installed on two frames respectively, with the lean-against members of the brackets emplaced on the edges of frames, and the tension members at the central parts of brackets hooked on ribs inside the frames, so as to uniformly emplace the brackets on the frames, by a principle that a plane is formed by three points. Accordingly, the bracket is parallel to a normal of the surface of frame. Finally, the inspecting rod is made to be parallel to the plane of frame after putting up the inspecting rod vertically. Therefore, it is very easy and convenient to install the device. On the other hand, upon operating, the light emitter at the very end of the level inspecting rod can be rotated, so as to enable colored light emitted to be directly shining on the scale meter on the bracket, for determining an error in angle between the frame and the steering wheel. Next, by a cross comparison among the bi-directional level at a top end of the inspecting rod, the light emitter, and the indication area corresponding to the light emitter, an accuracy of wheel alignment at two sides can be determined, which is a rather simple and convenient operational method, and thus is very suitable for a car driver to operate by oneself at home. If a result of inspecting shows an inaccurate alignment, or even endanger in driving, the car can be delivered to a service workshop for repairing by a professional, thereby saving a cost of asking the professional to perform wheel alignment at each time.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
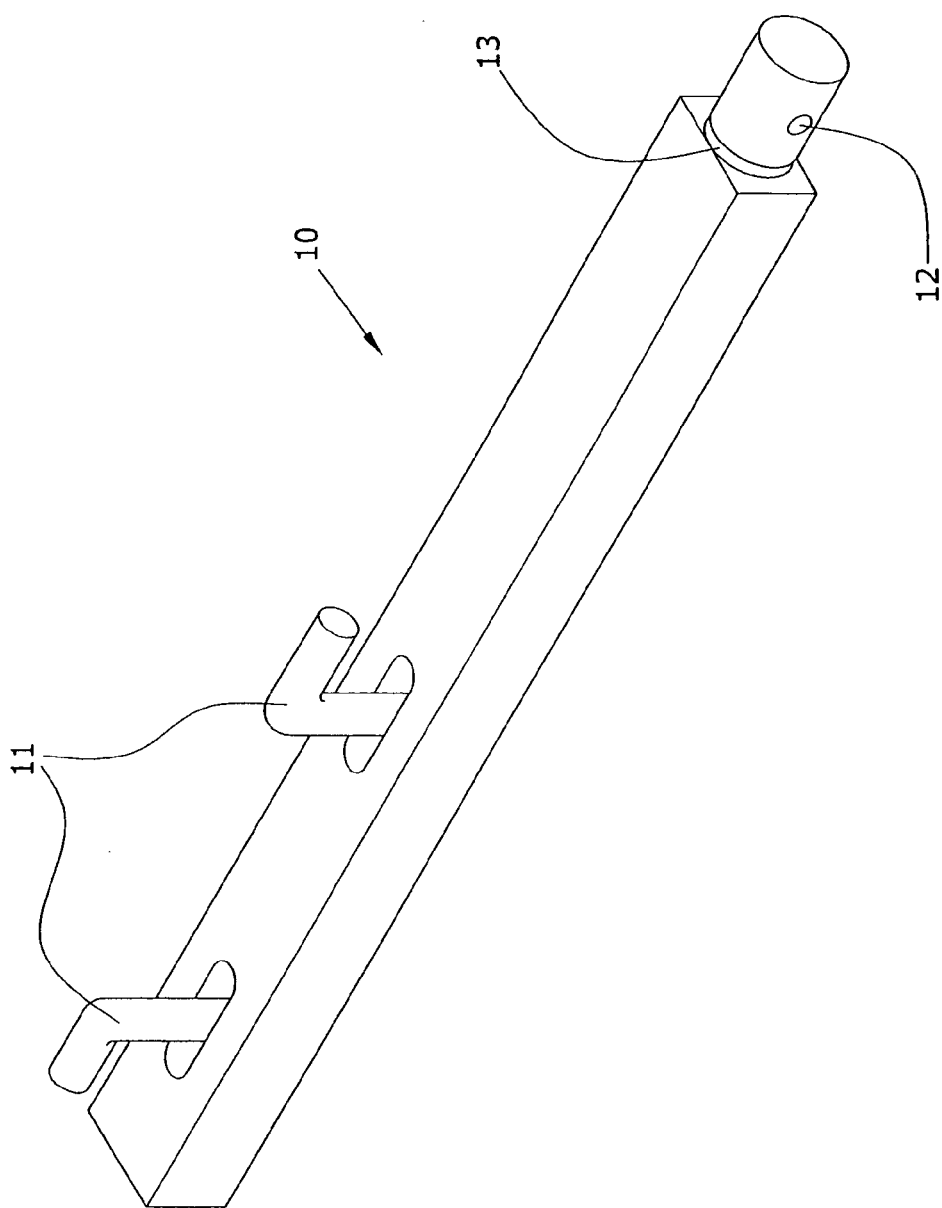
FIG. 1 shows a perspective view of a level inspecting rod of the present invention.
Figure 2:
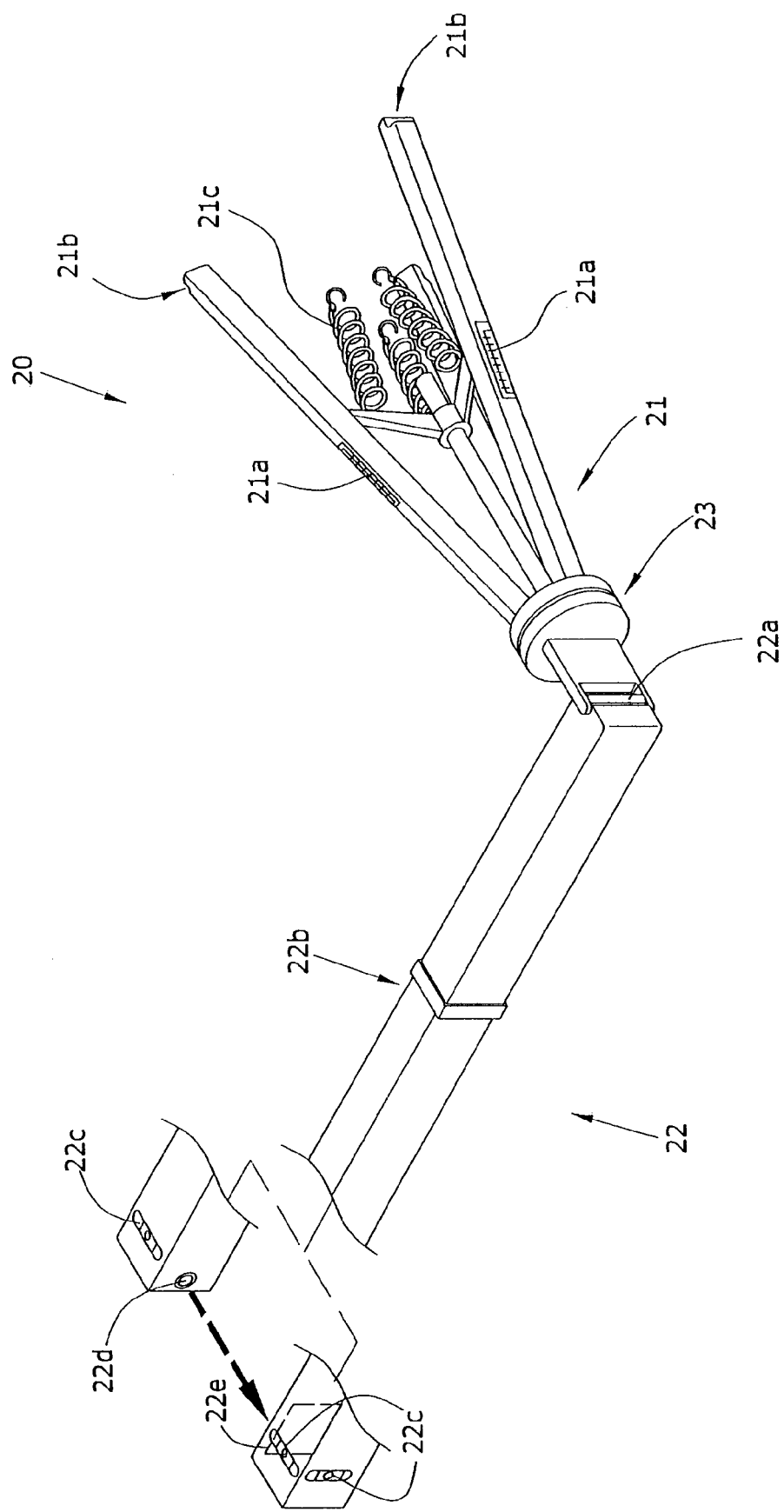
FIG. 2 shows a perspective view of an alignment inspecting rack of the present invention.
Figure 3:
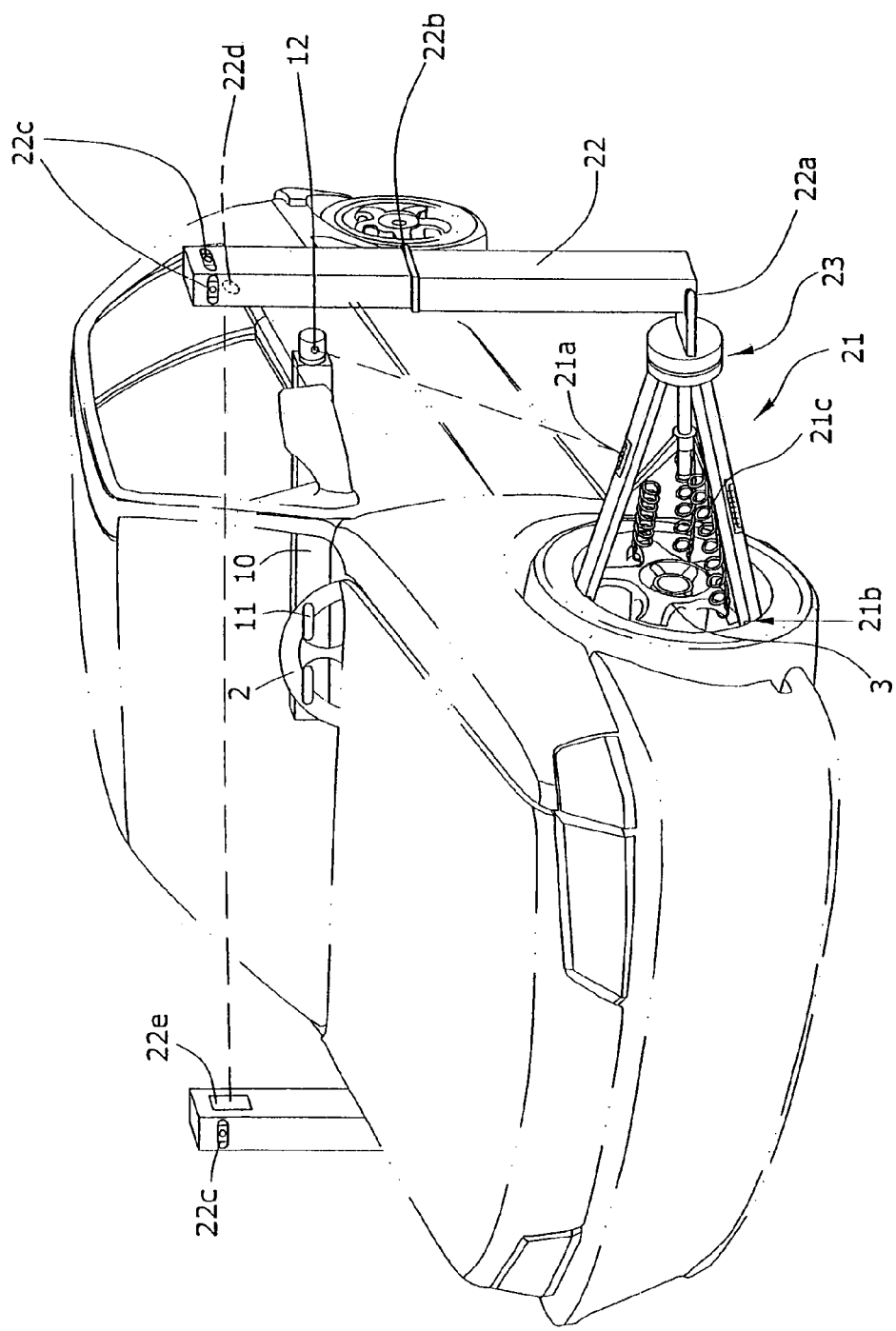
FIG. 3 shows a schematic view of an operation of the present invention.

Referring to FIG. 1, FIG. 2, and FIG. 3, the present invention comprises a level inspecting rod 10 and two alignment inspecting racks 20, wherein a fixing member 11 and a light emitter 12 are located at two ends of the level inspecting rod 10, respectively. The fixing member 11 is used to fix on a steering wheel 2, and the light emitter 12 is located on a rotating member 13. Light can be shining on a scale meter 21a on a bracket 21 by adjusting the rotating member 13.

A three-leg bracket 21 is located at a bottom of the alignment inspecting rack 20, with the scale meter 21a located at a proper position on a surface of the bracket 21. A lean-against member 21b which can be latched on an edge of a frame 3 is located at a bottom of the bracket 21, and a tension member 21c which can be hooked on the frame 3 is located at a central part of the bracket 21. The tension member 21c can be a spring or an elastic rope. A rotating member 23 which is installed at a connection point between the bracket 21 and the inspecting rod 22 can be used to adjust a relative angle between the inspecting rod 22 and the bracket 21. A pivot member 22a and a retractable member 22b are located at proper positions of the inspecting rod 22. The pivot member 22a is designed to put up the inspecting rod 22 vertically, so as to form a 90 degree between the inspecting rod 22 and the bracket 21 by directly bending or fixing with screws; whereas the retractable member 22b is used to adjust a length of the inspecting rod 22. On the other hand, a bi-directional level 22c and a light emitter 22d are located at the topmost end of the inspecting rod 22, and a bi-directional level 22c and an indication area 22e corresponding to light emitted by the light emitter 22d are located at a top end of the alignment inspecting rod 20 on the frame 3 at the other side. The aforementioned bi-directional level 22c is used to calibrate a horizontal status of the inspecting rod 22, and the light emitter 22d can emit colored light for indicating.

When using the device, the steering wheel 2 is firstly put into a straight position, and the fixing member 11 of the level inspecting rod 10 is fixed on the steering wheel 2. In addition, the light emitter 12 at the very end of the level inspecting rod 10 is stretched out of a window. Next, the two alignment inspecting racks 20 are installed on the two frames 3 respectively, with the lean-against member 21b of the bracket 21 emplaced on an edge of frame 3, and the tension member 21c at the center of the bracket 21 hooked on ribs inside the frame 3, so as to uniformly emplace the bracket 21 on the frame 3. The bracket 21 is parallel to a normal of a surface of the frame 3. Finally, the inspecting rod 22 is made to be parallel to a plane of the frame 3, after putting up the inspecting rod 22 vertically. In operation, the rotation member 13 is first rotated to adjust the light emitter 12 at the very end of the level inspecting rod 10, so as to enable colored light emitted to be directly shining on the scale meter 21a on the bracket 21, for determining an error in angle between the frame 3 and the steering wheel 2. Second, an accuracy of wheel alignment at two sides is determined by a cross comparison among the bi-directional level 22c on the top end of the inspecting rod 22, the light emitter 22d, and the indication area 22e corresponding to the light emitter 22d.

Accordingly, the present invention is composed of the level inspecting rod installed on the steering wheel, and the alignment inspecting racks located at the wheels at two sides, which is very easy and convenient to be operated, and is very suitable for a car driver to operate by oneself at home, thereby saving a cost of asking a professional to perform wheel alignment at each time.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A simple inspection device for wheel alignment comprises a level inspecting rod and two alignment inspecting racks, wherein a fixing member and a light emitter are located at two ends of the level inspecting rod, and the alignment inspecting racks are composed of an inspecting rod and a bracket; a scale meter being located at a proper position on the bracket, a lean-against member being located at a bottom of the bracket, and a tension member being located at a central part of the bracket; a bi-directional level and a light emitter being located at a top end of the inspecting rod, and a bi-directional level and an indication area corresponding to the light emitter being located at the alignment inspecting rod at the other side.

2. The simple inspection device for wheel alignment according to claim 1, wherein the fixing member and the light emitter are located at two ends of the level inspecting rod, with the fixing member being used to fix on a steering wheel, and the light emitter being located on a rotation member which can be adjusted to enable light to be directly shining on the scale meter on the bracket.

3. The simple inspection device for wheel alignment according to claim 1, wherein the bracket is located at a bottom of the alignment inspecting rod with the scale meter at a proper position on a surface of the bracket, the lean-against member which can be latched on an edge of frame is located at a bottom of the bracket, the tension member which can be hooked on a frame is located at a central part of the bracket, and the rotation member is located at a connection point between the bracket and the inspecting rod; another inspecting rod located at the other side of the bracket, and a pivot member and a retractable member located at proper positions of the inspecting rod; the pivot member being designed to put up the inspecting rod vertically, and the retractable member being used to adjust a length of the inspecting rod; the bi-directional level and the light emitter being located at the topmost end of the inspecting rod, and the bi-direction level and the indication area corresponding to the light emitter being located at a top end of the alignment inspecting rod at the frame at the other side.

4. The simple inspection device for wheel alignment according to claim 1, wherein the tension part is a spring.

5. The simple inspection device for wheel alignment according to claim 1, wherein the tension part is an elastic rope.

6. The simple inspection device for wheel alignment according to claim 1, wherein the pivot member can directly bend the inspection rod to form a 90 degree between the inspecting rod and the bracket.

7. The simple inspection device for wheel alignment according to claim 1, wherein the pivot member can form a 90 degree between the inspecting rod and the bracket by fixing the inspection rod with screws.

8. The simple inspection device for wheel alignment according to claim 1, wherein the bi-directional level is used to calibrate the horizontal status of the inspecting rod.

9. The simple inspection device for wheel alignment according to claim 1, wherein the light emitter emits colored light for indication.

* * * * *